(12) United States Patent
Fisher et al.

(10) Patent No.: US 11,193,565 B2
(45) Date of Patent: Dec. 7, 2021

(54) ANTI-ROTATION SYSTEM HAVING REPLACEABLE KEYWAY

(71) Applicant: Westcoast Cylinders Inc., New Westminster (CA)

(72) Inventors: Craig Fisher, New Westminster (CA); Brian Rooney, Vancouver (CA); Sean A. Campbell, Burnaby (CA); Gul Raiz Farooqi, Richmond (CA); Edward Foucher, Coquitlam (CA); Chris McGregor, Port Coquitlam (CA)

(73) Assignee: Westcoast Cylinders Inc., New Westminster (CA)

( * ) Notice: Subject to any disclaimer, the term of this patent is extended or adjusted under 35 U.S.C. 154(b) by 101 days.

(21) Appl. No.: 16/407,981

(22) Filed: May 9, 2019

(65) Prior Publication Data

US 2020/0355248 A1    Nov. 12, 2020

(51) Int. Cl.
*F16C 29/00* (2006.01)
*F16C 29/02* (2006.01)
(Continued)

(52) U.S. Cl.
CPC .......... *F16H 25/20* (2013.01); *F16C 29/004* (2013.01); *F16C 29/005* (2013.01); *F16C 29/02* (2013.01);
(Continued)

(58) Field of Classification Search
CPC ...... F16C 29/005; F16C 29/004; F16C 29/02; F16C 29/10; F16C 33/10; F16C 25/20; H02K 41/03; H02K 7/08; F16H 25/204; F16H 2025/2081; F16H 25/20; F16H 2025/204
(Continued)

(56) References Cited

U.S. PATENT DOCUMENTS 2,894,772 A * 7/1959 Hitt ........................ F16B 3/00
403/282
3,313,215 A    4/1967 Bieri
(Continued)

FOREIGN PATENT DOCUMENTS

CN    105605172 A  *  5/2016  ............. F16H 25/24
CN    108266510 A  *  7/2018  ............. F16H 25/22
(Continued)

OTHER PUBLICATIONS

Eliminator HD pamphlet, Sep. 24, 2018.

*Primary Examiner* — Marcus Charles
(74) *Attorney, Agent, or Firm* — Oyen Wiggs Green & Mutala LLP

(57) ABSTRACT

An anti-rotation system having a replaceable keyway is disclosed, wherein the system comprises a housing having a bore extending along an axis of the housing, and a housing aperture extending from an outside surface of the housing to the bore and extending along the housing parallel to the axis of the housing; a member configured to slide within the bore along the axis of the housing; an insert defining a keyway removably mounted on the housing wherein the keyway extends at least partially into the housing aperture; and a key carried by the member and engaged with the keyway defined by the insert; wherein the key cooperates with the insert to resist rotation of the member about the axis of the housing.

18 Claims, 14 Drawing Sheets

(51) Int. Cl.
*F16C 29/10* (2006.01)
*F16H 25/20* (2006.01)
*H02K 7/08* (2006.01)
*F16H 25/22* (2006.01)

(52) U.S. Cl.
CPC ......... *F16C 29/10* (2013.01); *F16H 25/2247* (2013.01); *H02K 7/08* (2013.01); *F16H 2025/204* (2013.01); *F16H 2025/2081* (2013.01)

(58) Field of Classification Search
USPC ...... 384/7, 21–22, 24, 26; 310/12.01, 12.27, 310/12.31, 17, 20
See application file for complete search history.

(56) References Cited

U.S. PATENT DOCUMENTS

| | | |
|---|---|---|
| 3,355,758 A | 12/1967 | Clark |
| 3,877,828 A | 4/1975 | Smith |
| 3,905,710 A | 9/1975 | Cain et al. |
| 6,752,560 B2 | 6/2004 | Wilson et al. |
| 6,951,123 B2 | 10/2005 | Chong |
| 7,604,415 B2 | 10/2009 | Casey et al. |
| 7,775,074 B1 | 8/2010 | Tobias et al. |
| 8,591,059 B2 | 11/2013 | Casey et al. |
| 9,441,651 B2 | 9/2016 | James |
| 9,587,415 B2 | 3/2017 | Walls et al. |
| 10,428,793 B2 * | 10/2019 | Wiens .................. F03D 1/0675 |
| 2003/0129023 A1 * | 7/2003 | Brunner .................. F16D 1/08 403/359.6 |
| 2009/0152960 A1 * | 6/2009 | Kimura .................. H02K 41/03 310/12.17 |
| 2010/0014976 A1 * | 1/2010 | Arel ........................ B64C 11/40 416/117 |
| 2011/0268498 A1 | 11/2011 | Robinson |
| 2011/0286842 A1 * | 11/2011 | Danielson ............ B64C 11/306 416/1 |
| 2016/0102692 A1 | 4/2016 | James |
| 2016/0298602 A1 * | 10/2016 | Wiens .................. F03D 1/0691 |
| 2020/0164457 A1 * | 5/2020 | Rosengren ........... B23K 11/318 |

FOREIGN PATENT DOCUMENTS

| | | | | |
|---|---|---|---|---|
| DE | 102006041882 A1 | * | 3/2008 | ............ F16C 29/005 |
| DE | 112006002312 T5 | * | 7/2008 | ............ H02K 41/03 |
| DE | 102014224499 A1 | * | 6/2016 | ............ F16H 25/20 |
| DE | 112014005362 T5 | * | 8/2016 | ............ F16H 25/20 |
| EP | 0438296 A2 | | 7/1991 | |
| EP | 3553342 A1 | * | 10/2019 | ........... G01L 5/0038 |
| JP | 2004537459 A | * | 12/2004 | |
| JP | 2007303515 A | * | 11/2007 | ............ F16H 25/20 |
| JP | 5097551 B2 | * | 12/2012 | ............ F16H 1/225 |
| JP | 2014029190 A | * | 2/2014 | ............ F16H 25/24 |
| JP | 6039748 B1 | * | 12/2016 | ............ F16H 25/24 |

* cited by examiner

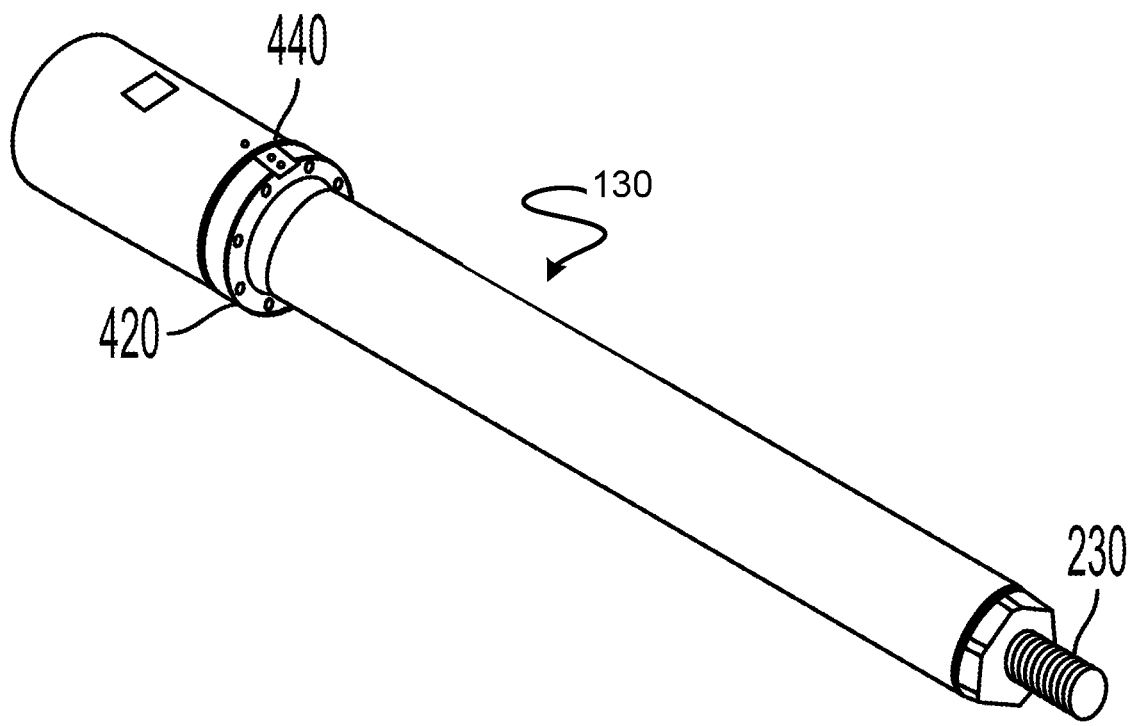
FIG. 4A
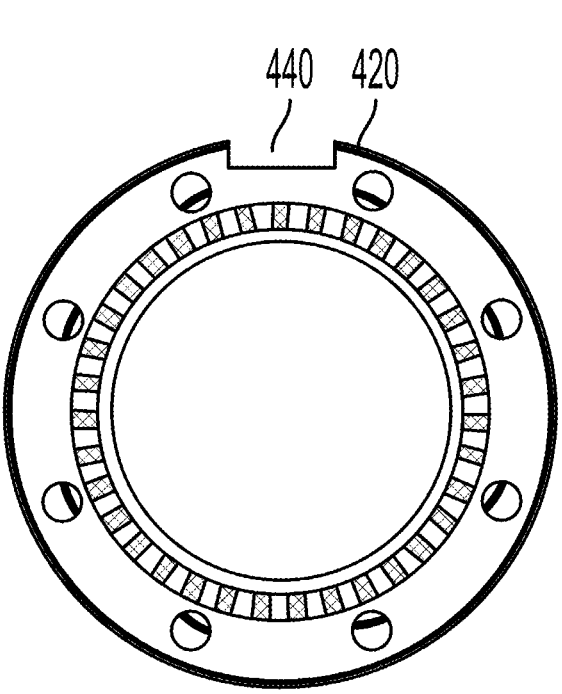 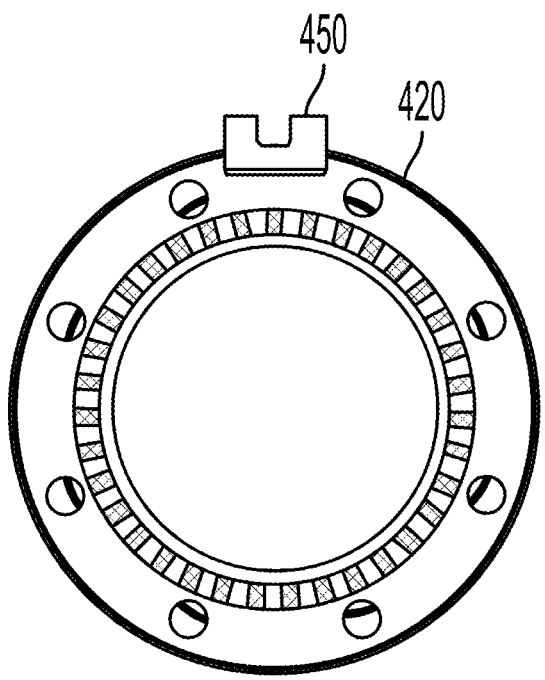
FIG. 4B                FIG. 4C

ANTI-ROTATION SYSTEM HAVING REPLACEABLE KEYWAY

TECHNICAL FIELD

The present disclosure is directed to anti-rotation systems and related methods. Some example embodiments provide linear actuators in which a part is held against rotation by engagement of a key in a keyway.

BACKGROUND

There are many applications where it is desirable to allow a member to move in an axial or longitudinal direction while preventing rotation of the member. A known method for resisting rotation of a member applies a key and a cooperating keyway. The key is carried by the member, the member is at least partially enclosed in a housing, and a groove is machined into an interior wall of the housing to form a keyway. The key slides longitudinally along the keyway, and the key resists rotation about an axis parallel to the longitudinal direction.

An application of such keys and keyways is in cylinders used for precision orientation of sliding members.

Disadvantages of such systems include:
- keys and keyways wear out, necessitating time-consuming and expensive re-machining and repair of housings and members;
- limitations of conventional keyway machining limits the possible size, length and position of keyways within a housing; and
- the member carrying the key typically must be removed from the housing to permit rotation of the member.

There is a general desire for an improved key and keyway.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This invention has a number of aspects. Some aspects of the invention include, without limitation:
- anti-rotation systems that can be applied to resist rotation of slidable members;
- linear actuators;
- methods for resisting rotation of movable members; and
- methods for servicing an apparatus that includes a key that slidably engages a keyway.

One aspect of the invention provides an apparatus comprising: a housing having a bore extending along an axis of the housing, and a housing aperture extending from an outside surface of the housing to the bore and extending along the housing parallel to the axis of the housing; a member configured to slide within the bore along the axis of the housing; an insert defining a keyway removably mounted on the housing; and a key carried by the member and engaged with the keyway defined by the insert; wherein the key cooperates with the insert to resist rotation of the member about the axis of the housing.

In some embodiments the keyway extends at least partially into the housing aperture. In some embodiments the key is removably mounted on the member.

In some embodiments the key is removable from the member through the housing aperture when the insert is removed from the housing.

In some embodiments the insert comprises a first insert segment and a second insert segment; the first insert segment and the second insert segment cooperate to define the keyway; and the key is removable from the member through the housing aperture when the second insert segment is removed from the housing.

In some embodiments the member is rotatable about the axis of the housing within the bore of the housing when the key is removed from the member.

In some embodiments the member has a keyseat, and the key is mounted at least partially within the keyseat.

In some embodiments the bearing is mounted upon a first end of a shaft extending along the axis of the housing and a second end of the shaft extends beyond the housing. In some embodiments, the second end of the shaft comprises a polygonal section and a threaded section.

In some embodiments the apparatus comprises a roller screw, ball screw, or acme leadscrew, wherein the shaft is driven by the roller screw, ball screw, or acme leadscrew. In some embodiments a motor is mechanically coupled to the roller screw, ball screw, or acme leadscrew.

Some embodiments comprise a gasket between a ledge of the housing and a flange of the insert to seal the housing aperture when the insert is mounted on the housing.

One aspect of the invention provides a linear actuator comprising: a cylinder having a bore extending along an axis of the cylinder and an aperture extending from an outside surface of the cylinder to the bore and extending along the cylinder parallel to the axis of the cylinder; an insert defining a keyway removably mounted on the cylinder wherein the keyway extends at least partially into the aperture; a linear bearing configured to slide within the bore along the axis of the cylinder and to resist movement perpendicular to the axis of the cylinder; a key removably mounted on the bearing and engaged with the keyway defined by the insert; wherein the key cooperates with the insert to resist rotation of the bearing about the axis of the cylinder and the key is removable from the bearing through the aperture when the insert is removed from the cylinder.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced Figures of the drawings. It is intended that the embodiments and Figures disclosed herein are to be considered illustrative rather than restrictive.

FIG. 2C is a partial view of an output shaft of the linear actuator depicted in

FIG. 2A.

FIG. 4A is a perspective view of an output shaft and bearing according to an example embodiment.

FIGS. 4B and 4C are front views of a bearing according to an example embodiment.

FIG. 10 is method for enabling rotation of an anti-rotation system having a replaceable keyway according to an example embodiment.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1A:
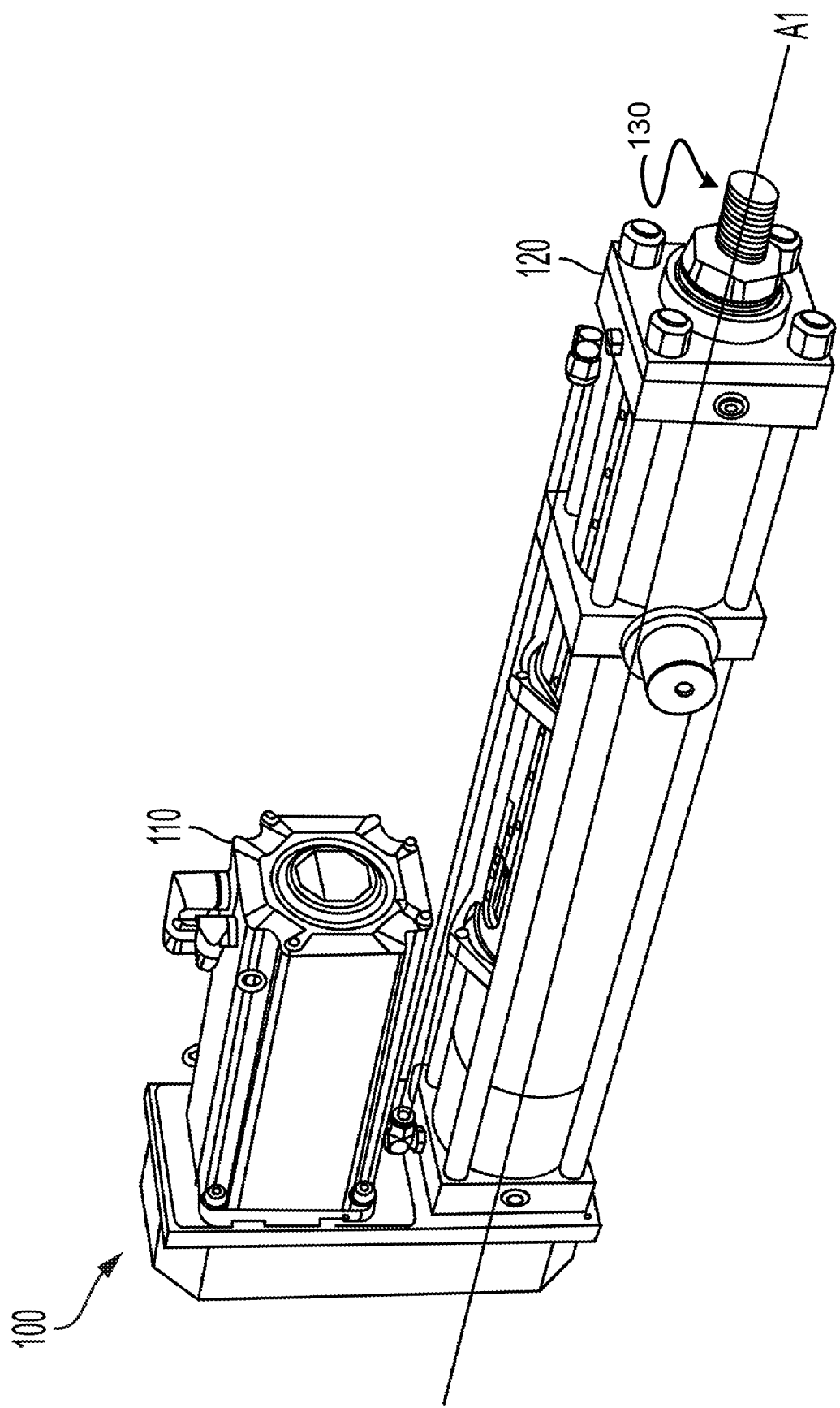
FIG. 1A is a perspective view of a motor and a linear actuator according to an example embodiment.

FIG. 1A depicts apparatus 100 comprising a motor 110 and a linear actuator 120. An output of motor 110 is mechanically coupled to an input of linear actuator 120 to transmit torque from motor 110 to linear actuator 120. Linear actuator 120 comprises output shaft 130. Linear actuator 120 translates torque from motor 110 into linear force on output shaft 130 along axis A1. Output shaft 130 is configured to reciprocate along axis A1.

Linear actuator 120 further comprises a member 125 (see FIG. 1B) configured to slide axially along axis A1 and resist force perpendicular to axis A1. Member 125 carries a key 450 (see FIG. 8A). Linear actuator 120 comprises an insert 260 (see FIG. 2A) defining a keyway. As member 125 slides along axis A1, key 450 carried by member 125 cooperates with the keyway defined by insert 260 to resist rotation of member 125 about axis A1 while providing low friction to axial motion of member 125 along axis A1. In some embodiments, member 125 may be a bearing 420 carried by output shaft 130. In other embodiments, member 125 may be a portion of output shaft 130, or any other component configured to slide axially along axis A1 and to carry a key.

Insert 260 defining the keyway is removably mounted on a housing of linear actuator 120. Insert 260 may be removed from linear actuator 120 and replaced with a replacement insert, for example to replace a worn insert. The insert may also be removed from linear actuator 120 to access key 450 without removing output shaft 130 from linear actuator 120.

In some embodiments, key 450 is removably mounted on member 125. In some embodiments, when key 450 is accessed by removing insert 260 from the housing of linear actuator 120, key 450 may be removed from member 125 without removing member 125 from the housing. Key 450 may then be replaced with a replacement key, for example to replace a worn key. Furthermore, once key 450 is removed from member 125, output shaft 130 may be rotated about axis A1. Key 450 may then be remounted on member 125 and the insert 260 remounted on the housing to once again resist rotation of output shaft 130 about axis A1.

In some embodiments, key 450 is removable from member 125 without removing insert 260 from the housing of linear actuator 120. In these embodiments, insert 260 may form an aperture for accessing key 450, and/or key 450 may be removed from member 125 by removing member 125 from the housing of linear actuator 120.

Output shaft 130 may be coupled to another component to transmit linear force to that component, for example a press or a lift. The component coupled to output shaft 130 may exert a torque on output shaft 130 about axis A1. Where a torque is exerted on output shaft 130 by the component, the key cooperates with the keyway defined by insert 260 to resist rotation of output shaft 130 about axis A1.

FIG. 1A depicts output shaft 130 fully retracted along axis A1 into linear actuator 120. The maximum distance linear actuator 120 can drive output shaft 130 along axis A1 is the stroke length of linear actuator 120.

Figure 1B:
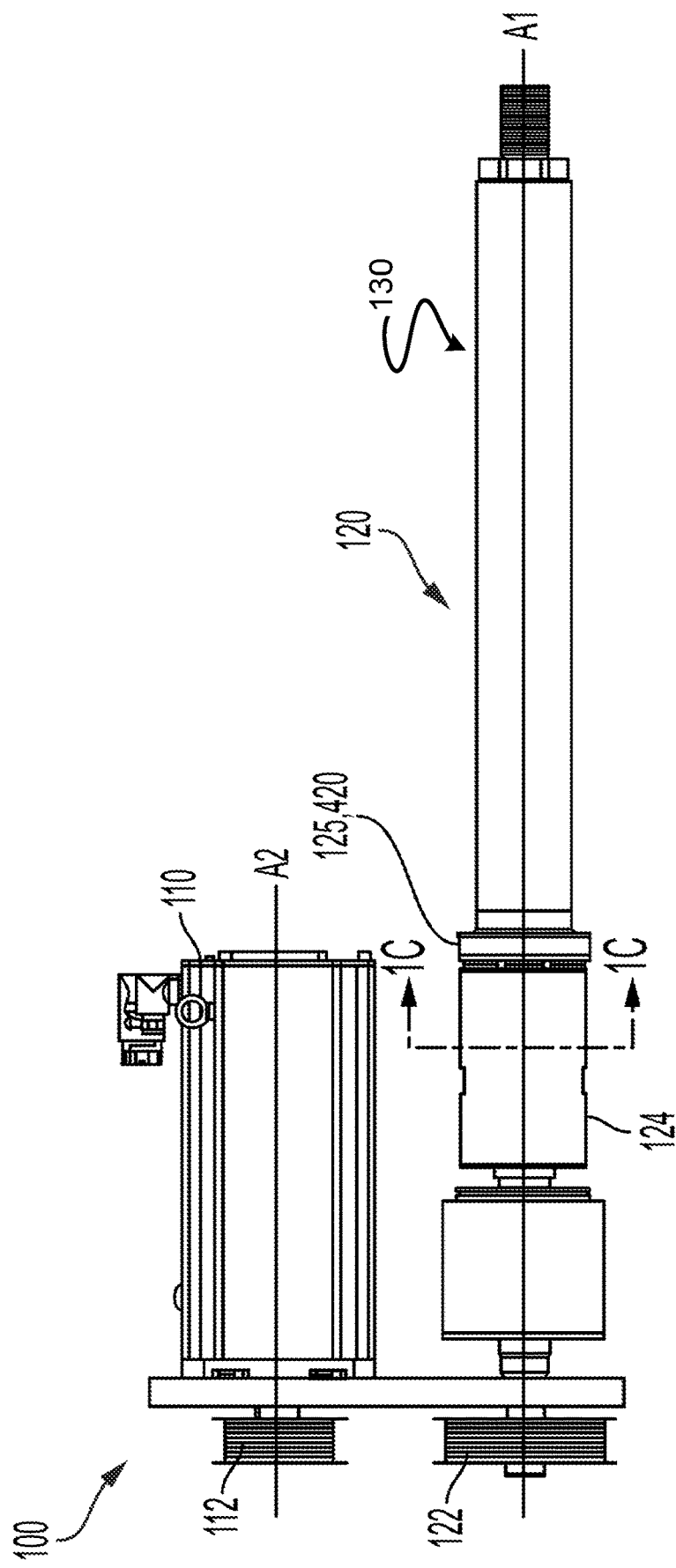
FIG. 1B is a side view of a motor and a partial side view of a linear actuator according to an example embodiment.
Figure 1C:
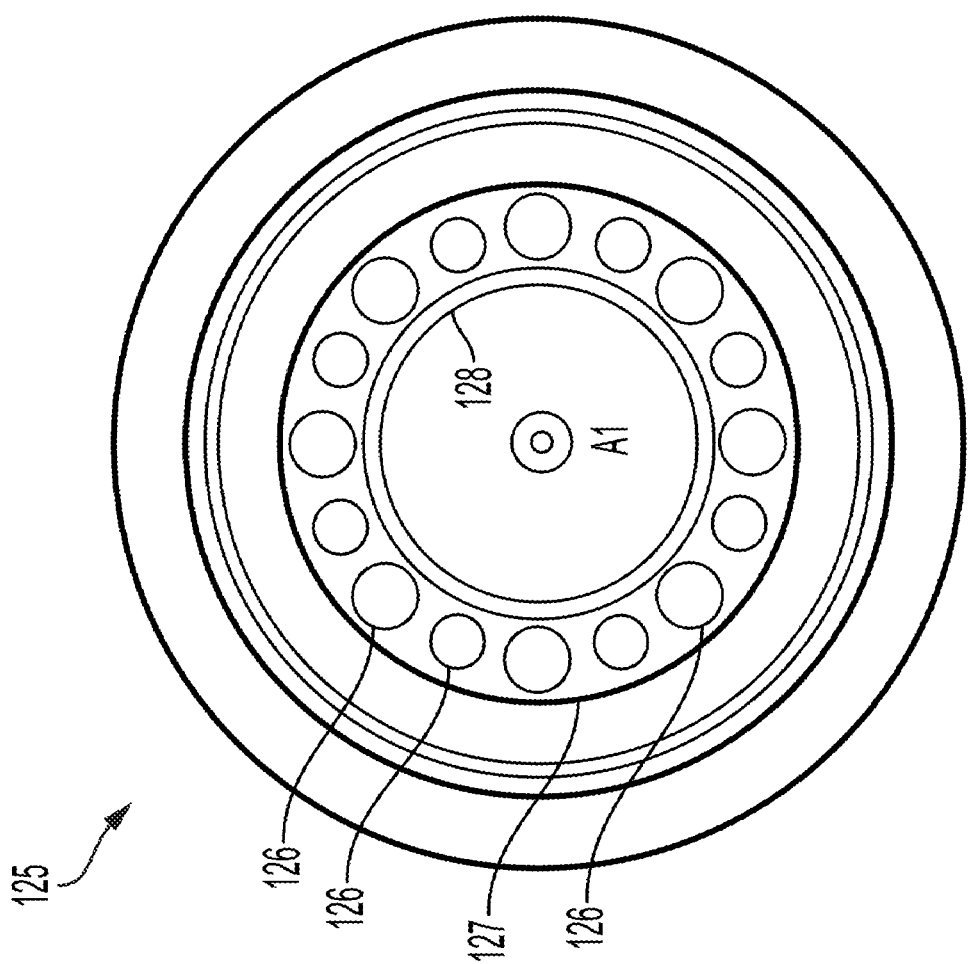

FIG. 1B is a side view of apparatus 100, depicting motor 110 and a partial view of linear actuator 120. Motor 110 comprises output 112, and linear actuator 120 comprises input 122. Motor 110 drives output 112 about axis A2. Output 112 is mechanically coupled to input 122 to transmit force from output 112 to input 122.

Input 122 is driven to rotate about axis A1 by output 112 of motor 110. Linear actuator 120 comprises any mechanical device capable of translating torque upon input 122 into linear force upon output shaft 130. In some embodiments, linear actuator 120 comprises a screw-type mover 124, for example a roller screw, ball screw, planetary roller screw, or acme leadscrew.

Figure 10:
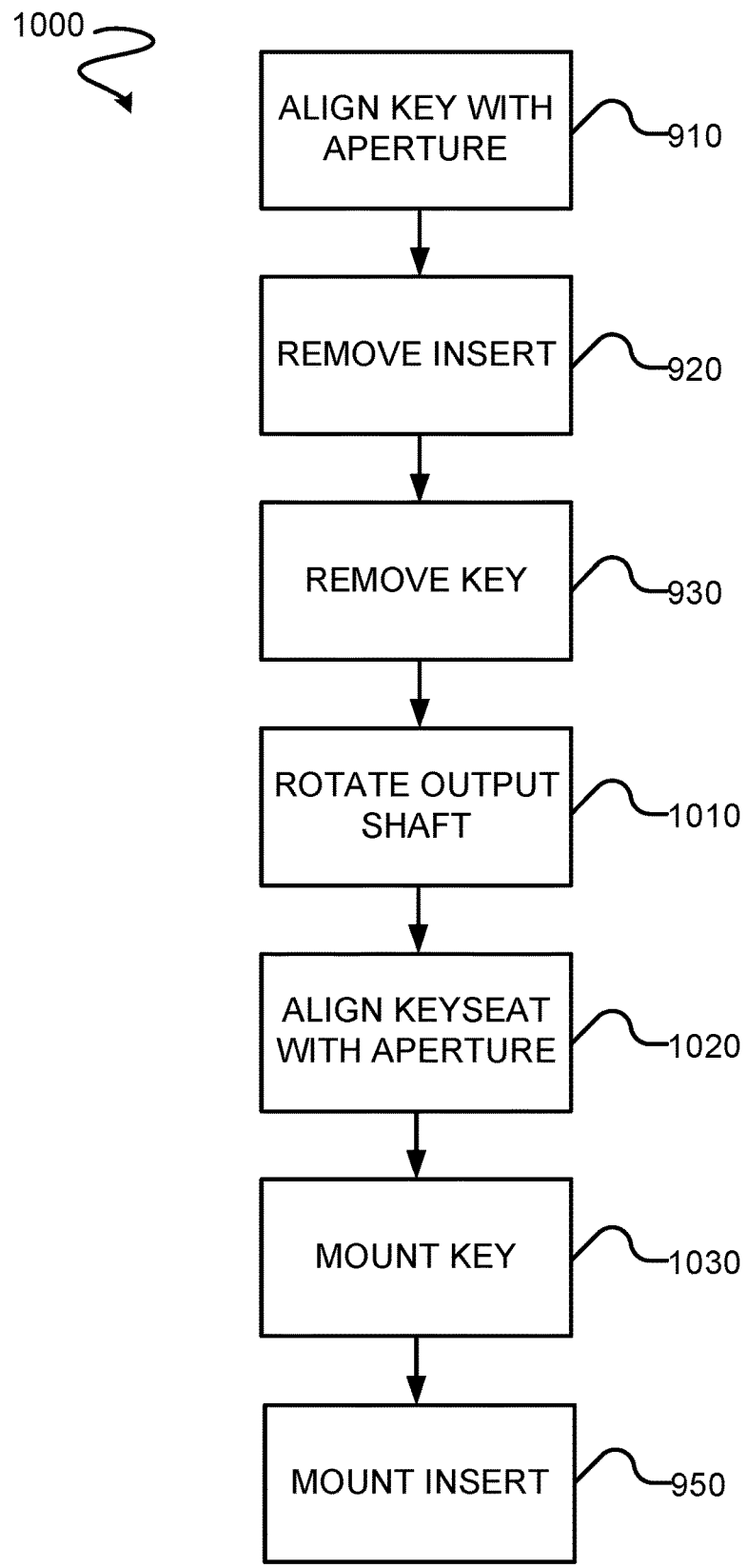
FIG. 10 is a partial cross-sectional view along line 10-10 of the linear actuator depicted in FIG. 1B.

FIG. 10 is a cross-sectional view of screw-type mover 124 along line 10-10 in FIG. 1B, wherein screw-type mover 124 comprises a roller screw 125. Roller screw 125 comprises a threaded shaft 128 and nut 127 comprising a plurality of rollers 126. Input 122 is mechanically coupled to threaded shaft 128 to transmit a rotational force on input 122 into a rotational force on threaded shaft 128 about axis A1. Nut 127 is mounted to bearing 420 and output shaft 130.

Rollers 126 are configured to rotate around threaded shaft 128. As threaded shaft 128 rotates about axis A1, rollers 126 rotate about threaded shaft 128, and transmit a rotational force and a linear force from threaded shaft 128 to nut 127. Rollers 126 may also rotate about their own center axis within nut 127 to reduce rotational friction between rollers 126 and threaded shaft 128.

As threaded shaft 128 drives nut 127, threaded shaft 128 exerts a rotational force on nut 127. Nut 127 is coupled to bearing 420, and key 450 mounted on bearing 420 cooperates with the keyway defined by insert 260 to resist the rotation of bearing 420 and nut 127 about axis A1. As nut 127 is held against rotation, the net force on nut 127 from threaded shaft 128 is along axis A1.

In some embodiments, threaded shaft 128 is fixed axially along axis A1, for example by a thrust bearing.

FIG. 1A depicts motor 110 mounted in parallel with linear actuator 120. In other embodiments, motor 110 may be mounted in any configuration which allows motor 110 to power linear actuator 120, for example in-line direct mounting or angle mounting. In some embodiments, motor 110 is an electric motor, for example an electric servo motor.

Motor 110 transfers power to linear actuator 120 via any suitable mechanical coupling. FIG. 1B depicts an embodiment where output 112 comprises a first shaft, and input 122 comprises a second shaft. First shaft 112 and second shaft 122 may be mechanically coupled by a belt, suitable gearing, a timing chain or the like.

Figure 2A:
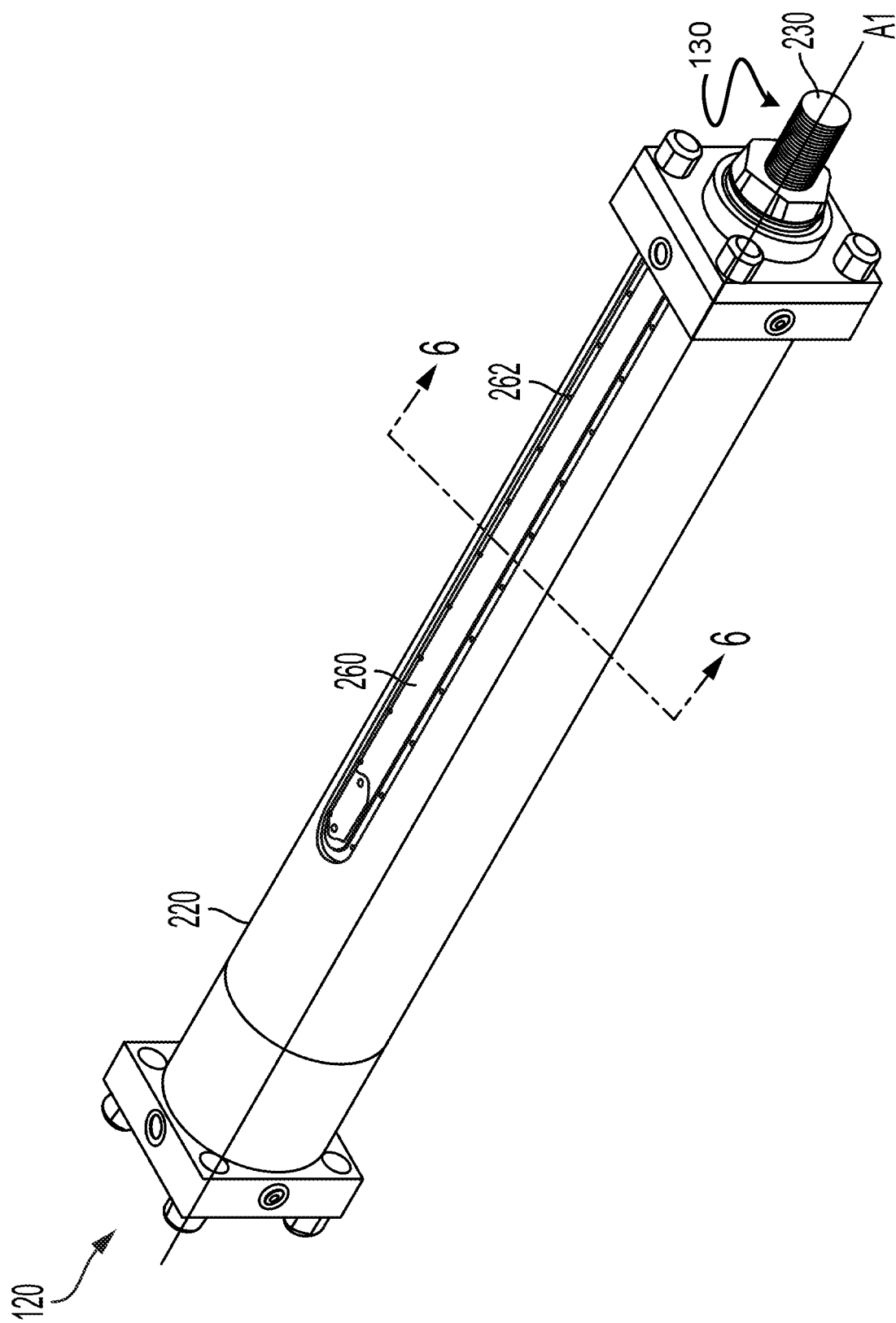
FIG. 2A is a perspective view of a linear actuator according to an example embodiment.

FIG. 2A depicts an example linear actuator 120. Linear actuator 120 comprises housing 220 and output shaft 130. Housing 220 may be any shape including a cylinder. Linear actuator 120 drives output shaft 130 along axis A1. FIG. 2A depicts output shaft 130 fully retracted into housing 220.

Figure 2B:
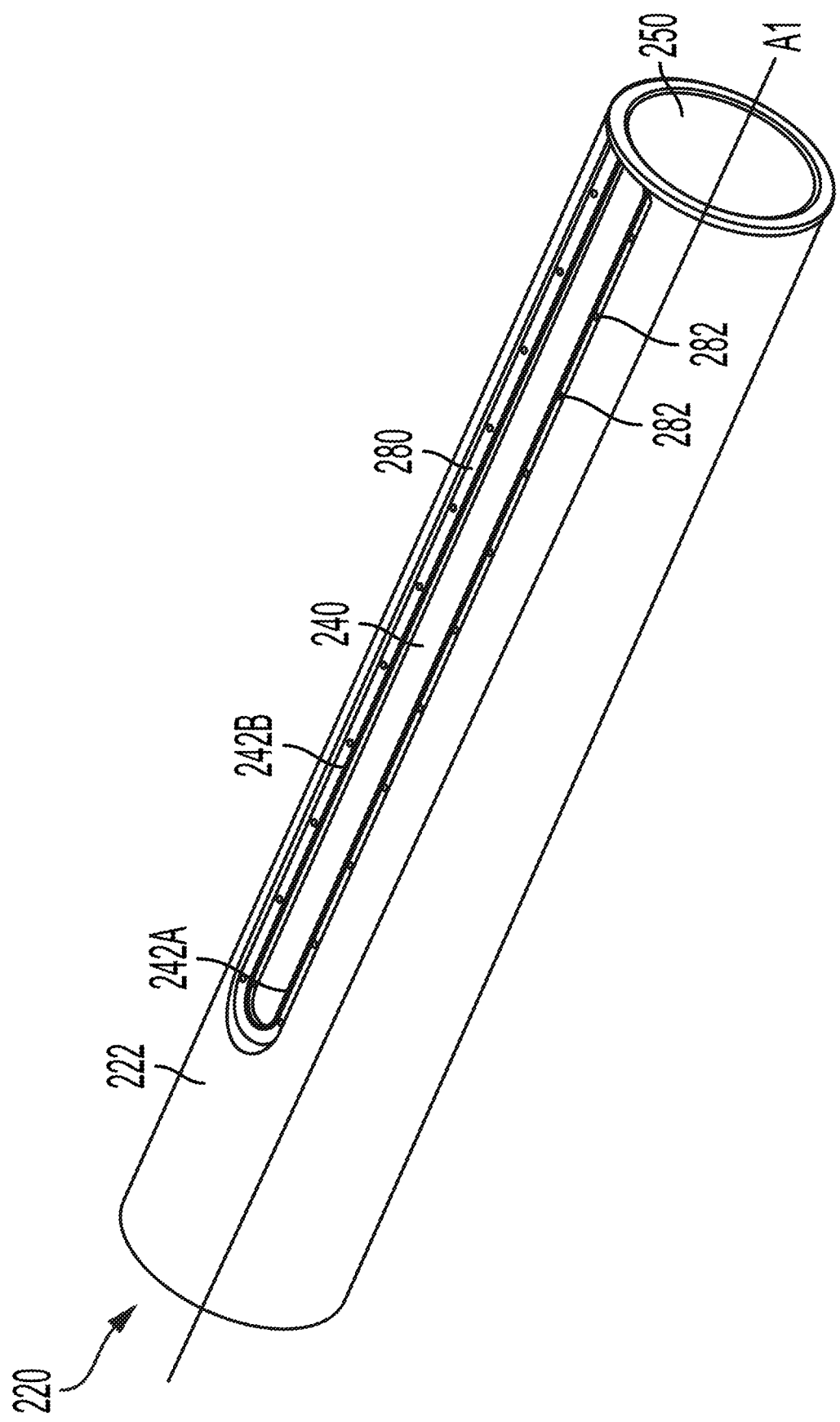
FIG. 2B is a perspective view of a housing of the linear actuator depicted in FIG. 2A.

Linear actuator 120 comprises insert 260 defining keyway 310 (see FIG. 3B) removably mounted on housing 220. FIG. 2B depicts housing 220. Housing 220 has bore 250 extending along axis A1. In some embodiments, bore 250 is substantially circular about axis A1. Housing 220 has aperture 240 extending from outside surface 222 of housing 220 to bore 250. Aperture 240 may in part be defined by first and second walls 242A and 242B extending along housing 220 and in parallel with each other and axis A1. Aperture 240 may, for example, be rounded at one or both ends, or blunt at one or both ends with rounded or square corners.

In some embodiments, housing 220 may comprise a ledge 280 extending at least partially around aperture 240. Ledge 280 may extend within a plane parallel with axis A1. Housing 220 may define a plurality of threaded holes 282 spaced about and proximate to aperture 240. In embodiments comprising ledge 280, threaded holes 282 may extend through ledge 280.

In some embodiments, insert 260 extends at least partially into aperture 240. In some embodiments, the portion of insert 260 extending into aperture 240 is dimensioned to be securely received by aperture 240. In some embodiments, insert 260 substantially fills aperture 240.

In some embodiments, insert 260 comprises flange 340 (see FIG. 3A) extending along a periphery of insert 260 and configured to abut an exterior of housing 220. Flange 340 may define a plurality of holes 344 spaced about flange 340. In embodiments of housing 220 comprising ledge 280, flange 340 may be configured to abut ledge 280. Holes 344 in flange 340 may be configured to align with threaded holes 282 in ledge 280 when insert 260 is mounted on housing 220.

Insert 260 may be removably mounted on housing 220 by screws extending through insert 260 and into housing 220, for example by screws 262 extending through flange 340 of insert 260 into ledge 280 of housing 220.

Linear actuator 120 may comprise a gasket (not depicted) between flange 340 of insert 260 and ledge 280 of housing 220 to form a seal between insert 260 and housing 220. In some embodiments, bore 250 of housing 220 is filled with a fluid, for example oil.

In some embodiments, linear actuator 120 may comprise two or more inserts defining two or more parallel keyways. In such embodiments, member 125 may carry a number of keys equal to the number of keyways.

Output shaft 130 may comprise attachment head 230 on a section of output shaft 130 which extends outside of housing 220 when output shaft 130 is fully retracted into housing 220. Attachment head 230 is configured to couple to a component and transfer force between output shaft 130 and the component. In some embodiments, the component may include a press or a lift.

Figure 2C:
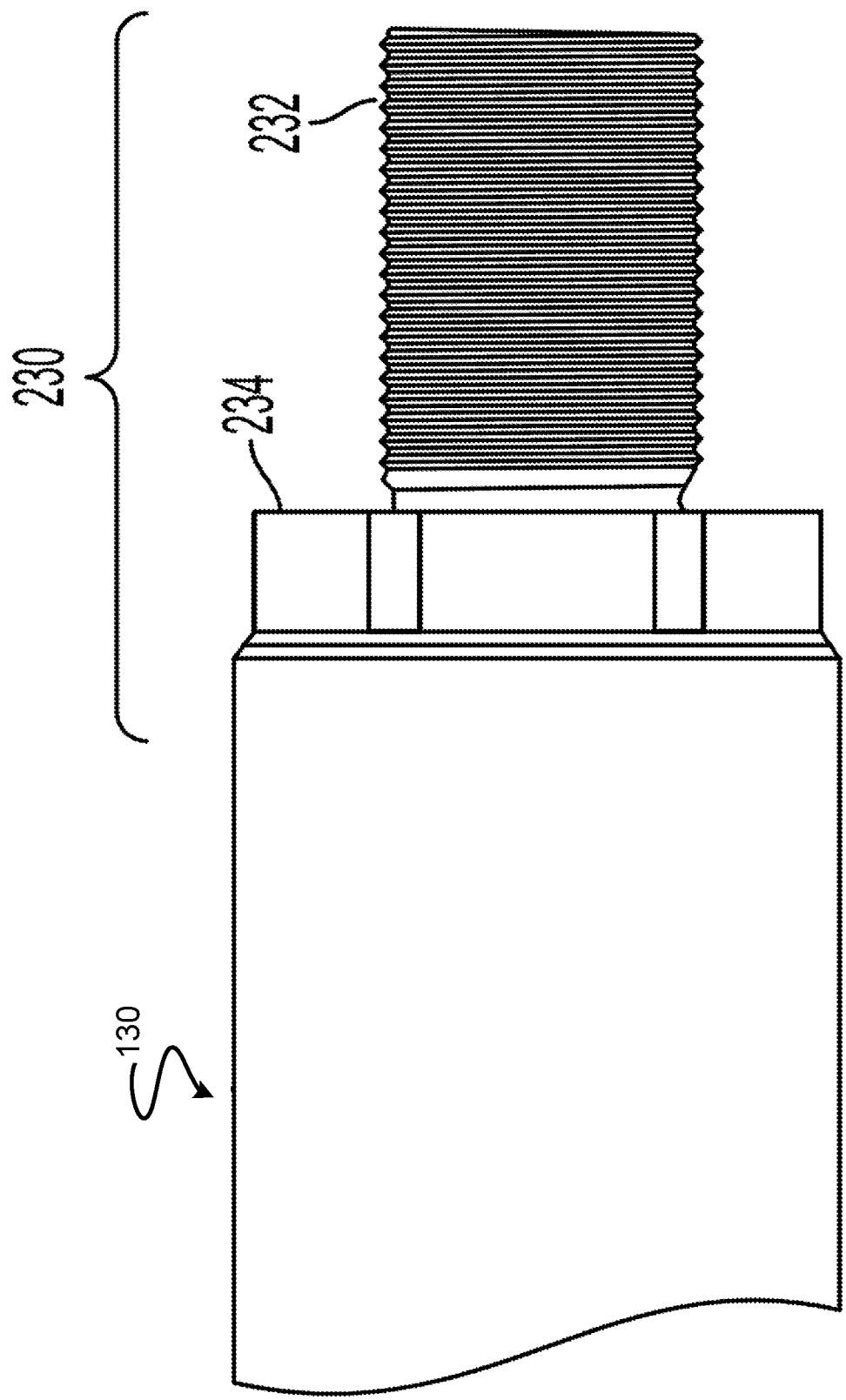

FIG. 2C depicts one embodiment of attachment head 230 comprising threaded section 232 and drive head 234. Threaded section 232 facilitates coupling output shaft 130 to a component, for example by screwing threaded section 232 into a mating section of a component. Drive head 234 may have two or more flat surfaces. In some embodiments, drive head 234 is polygonal in cross-section, for example hexagonal in cross-section.

In embodiments where key 450 is removable from member 420, key 450 may be removed from member 420 to permit rotation of output shaft 130. When key 450 is removed from member 420, a tool may interface with drive head 234 to apply a rotational force on output shaft 130 about axis A1.

Figure 3A:
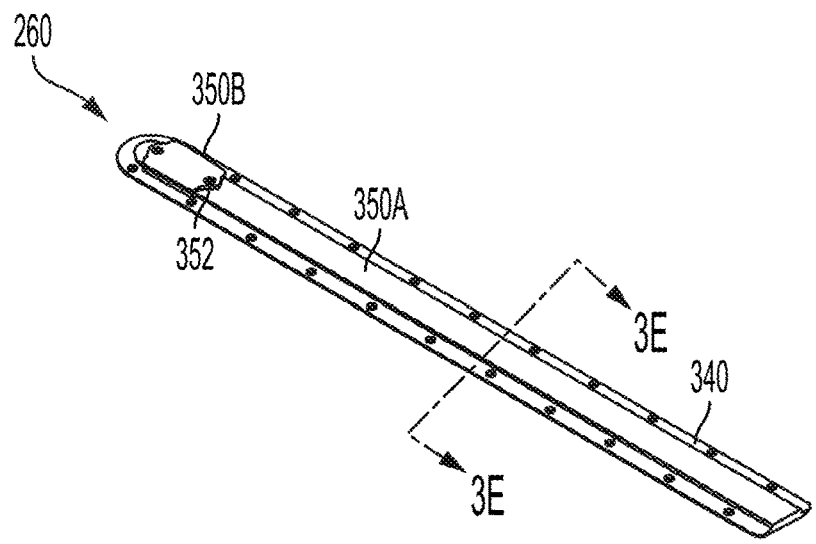
FIGS. 3A and 3B are perspective views of an insert defining a keyway according to an example embodiment.
Figure 3B:
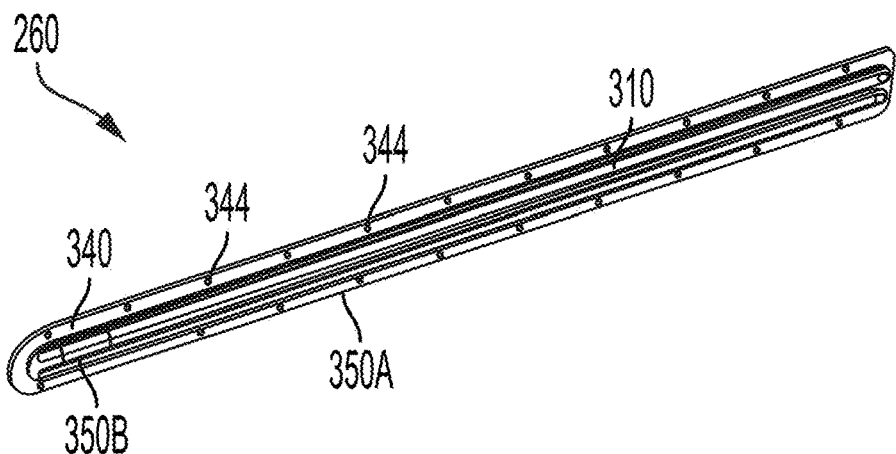

FIGS. 3A and 3B respectively depict perspective top and bottom views of an example insert 260. Insert 260 defines keyway 310. Keyway 310 comprises one or more grooves 320. FIGS. 3A to 3D depict an example embodiment of keyway 310 comprising two grooves, 320A and 320B. Grooves 320 may have any suitable configurations. For example, grooves 320 may comprise ends that are rounded, triangular, squared or have other shapes. FIG. 3A shows an example case in which grooves 320A and 320B have rounded ends.

In other embodiments, keyway 310 may comprise any number of longitudinally extending, parallel grooves, or a single longitudinally extending groove. FIG. 3B depicts grooves 320A and 320B with substantially equal length, depth and width between grooves. In other embodiments, grooves 320A and 320B may differ in one or more of depth and width.

When insert 260 is mounted on housing 220, grooves 320 of keyway 310 run parallel with axis A1. Grooves 320 extend along insert 260 for a distance at least as long as the stroke length (defined above) of linear actuator 120.

Figure 3C:
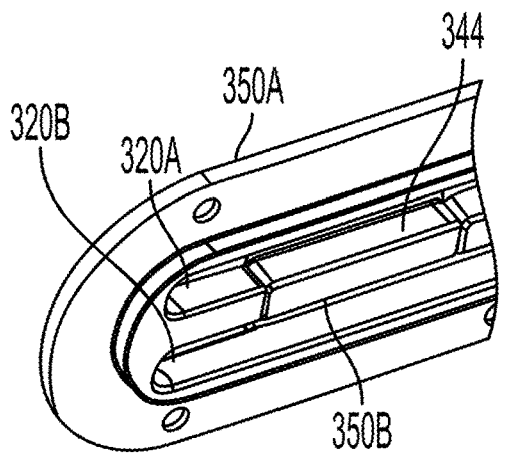
FIGS. 3C and 3D are partial perspective views of the insert depicted in FIG. 3A.
Figure 3D:
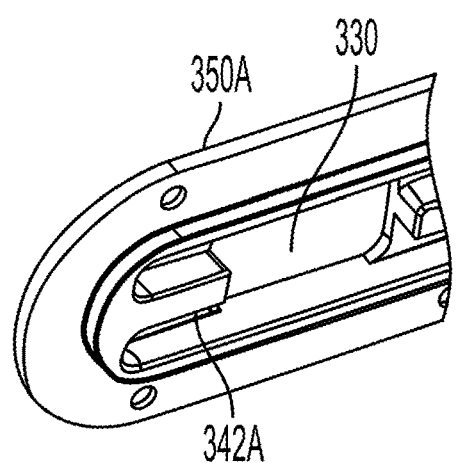
Figure 3E:
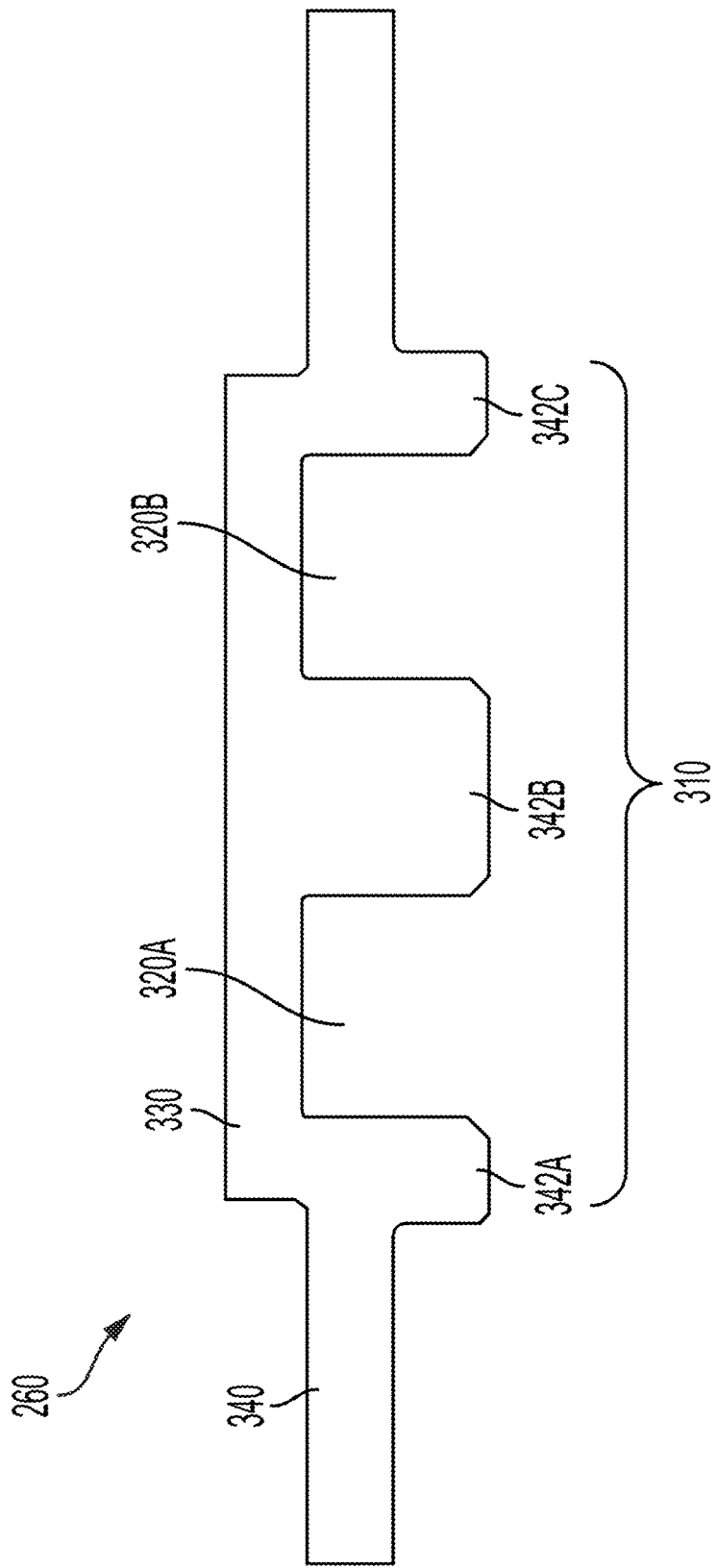
FIG. 3E is a cross-sectional view along line 3E-3E of the insert depicted in FIG. 3A.

FIG. 3E is a cross-sectional view of insert 260 along line 3E-3E of FIG. 3A. Insert 260 may further comprise base 332 and one or more parallel walls 342 extending perpendicular to base 332. FIG. 3E depicts an embodiment of insert 260 comprising three walls, 342A, 342B and 342C. Walls 342A, 342B and 342C define grooves 320A and 320B of keyway 310. The surfaces of walls 342A, 342B and 342C provide bearing surfaces for key 450 (see FIG. 8A). In some embodiments, walls 342A, 342B and 342C are configured to extend at least partially into aperture 240 when insert 260 is mounted on housing 220. In such embodiments, exterior walls 342A and 342C may be dimensioned to be received within aperture 240 and abut walls 242A and 242B of housing 220.

In some embodiments, insert 260 comprises two or more segments which cooperate to define keyway 310. In the embodiment depicted in FIGS. 3A to 3D, insert 260 comprises first segment 350A and second segment 350B. First segment 350A and second segment 350B each comprise parallel walls which cooperate to define different sections of grooves 320.

Where insert 260 comprises two or more segments, one or more segments of insert 260 may be mounted within one or more apertures defined by one or more other segments of insert 260. In the example embodiment depicted in FIGS. 3A to 3D, first segment 350A defines an aperture 330 (see FIG. 3D), and second segment 350B is mounted on first segment 350A and extends at least partially into aperture 330.

Aperture 330 may intersect with one or more walls of first segment 350A. As depicted in FIG. 3D, aperture 330 may intersect wall 342B. In embodiments where aperture 330 intersects wall 342B, wall 342B has a gap aligned with aperture 330. Second segment 350B comprises wall 344 configured to fill the gap in wall 342B when second segment 350B is mounted on first segment 350A. In some embodiments, wall 344 forms a smooth continuation of wall 342B so that wall 344 and 342B from a single unbroken wall.

As depicted in FIGS. 3B and 3C, when second segment 350B is mounted on first segment 350A, wall 344 of second segment 350B extends at least partially into aperture 330. Wall 344 of second segment 350B extends into aperture 330, aligns with wall 342B, and wall 344 cooperates with walls 342A, 342B and 342C to define keyway 310.

In some embodiments, second segment 350B is mounted on first segment 350A by screws 352 extending through a flange of second segment 350B into first segment 350A. In some embodiments, a gasket (not shown) is mounted between the flange of second segment 350B and first segment 350A to form a seal between first segment 350A and second segment 350B.

Figure 5A:
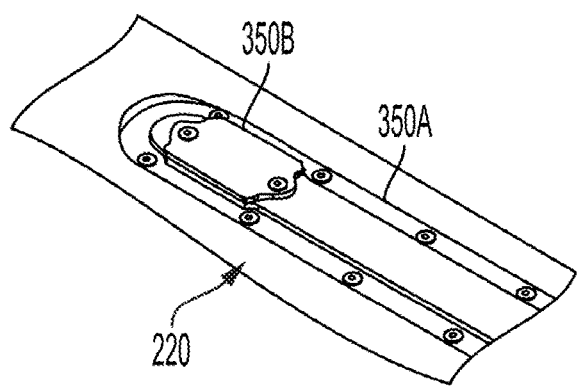
FIGS. 5A to 5E are partial views of a linear actuator according to an example embodiment.

FIG. 5A depicts second segment 350B mounted on first segment 350A. First segment 350A is mounted on housing 220.

Figure 5B:
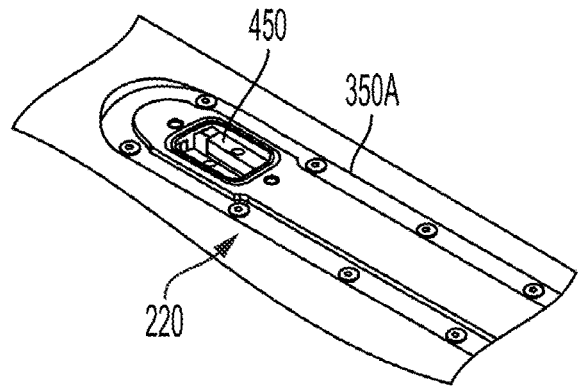

FIG. 5B depicts second segment 350B removed from first segment 350A and bearing 420. Aperture 330 is configured to expose key 450 mounted on bearing 420 when second segment 350B is removed from first segment 350A and output shaft 130 is fully retracted into housing 220. Aperture 330 is also configured to expose a keyseat 440 (defined below) of bearing 420 when second segment 350B is removed from first segment 350A and key 450 is removed from bearing 420.

Aperture 330 is further configured to permit removal of key 450 from bearing 420 through aperture 330, and mounting of key 450 on bearing 420 through aperture 330.

In other embodiments, aperture 330 may be configured to expose key 450 mounted on bearing 420 when second segment 350B is removed from first segment 350A and output shaft 130 is at a certain position relative to housing 220. For example, aperture 330 may expose key 450 when output shaft 130 is fully retracted, fully extended, or at any position in between.

Figure 5C:
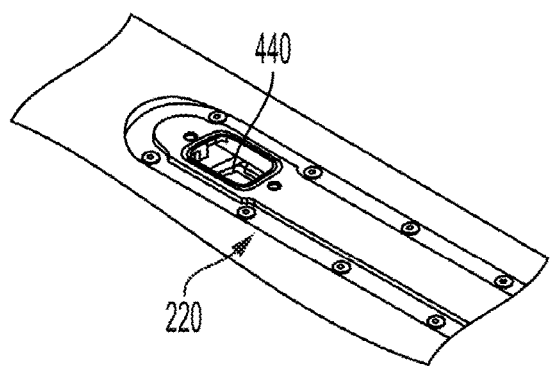

FIG. 5C depicts second segment 350B removed from first segment 350A and key 450 removed from bearing 420, exposing keyseat 440 of bearing 420.

Figure 5D:
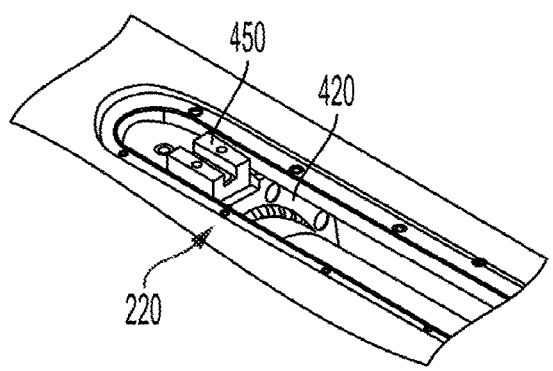

FIG. 5D depicts first segment 350A and second segment 350B removed from housing 220, and key 450 mounted on bearing 420.

Figure 5E:
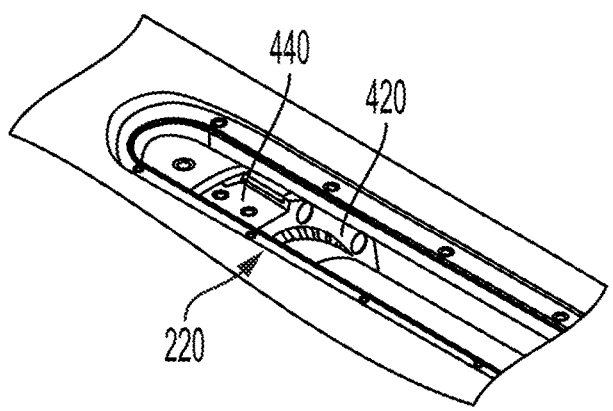

FIG. 5E depicts first segment 350A and second segment 350B removed from housing 220, and key 450 removed from bearing 420, exposing keyseat 440 of bearing 420.

FIG. 4A depicts linear actuator 120 comprising output shaft 130 and bearing 420. Output shaft 130 is substantially circular in cross section, and bearing 420 is mounted towards an end of shaft 130 opposite attachment head 230.

Bearing 420 is dimensioned to slide axially along axis A1 and rotate about axis A1 within bore 250 of housing 220. Bearing 420 has a cross-section perpendicular to axis A1 substantially equal to a cross-section of bore 250 perpendicular to axis A1.

Bearing 420 resists movement perpendicular to axis A1 by abutting the interior of housing 220 defining bore 250.

In some embodiments, bearing 420 comprises keyseat 440. Keyseat 440 is configured to securely receive key 450. As depicted in FIG. 4A, keyseat 440 comprises a recess into bearing 420. Where keyseat 440 comprises a recess, keyseat 440 may comprise walls extending into bearing 420 which provide contact surfaces for key 450 when mounted within keyseat 440.

FIGS. 4B and 4C are front views of bearing 420. FIG. 4C depicts key 450 mounted within keyseat 440 of bearing 420. Keyseat 440 comprises a recess extending into bearing 420. Key 450 may be mounted on bearing 420 by any secure method, for example by screws extending through key 450 into bearing 420.

Figure 6:
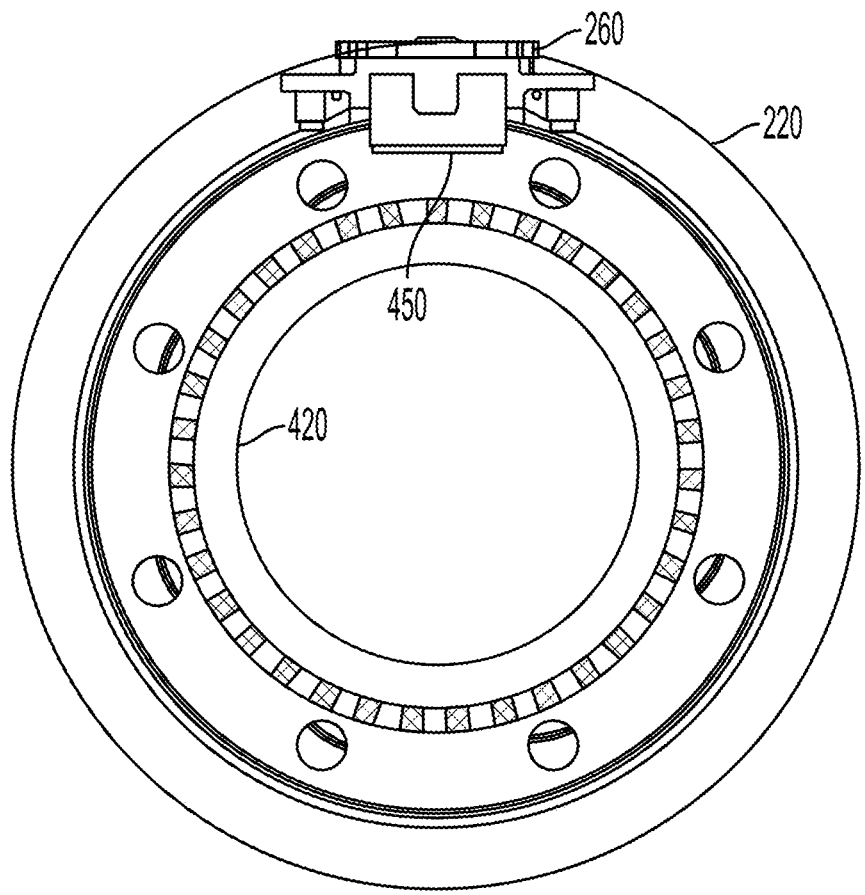
FIG. 6 is a cross-sectional view along line 6-6 of the linear actuator depicted in FIG. 2A.

FIG. 6 is a cross-sectional view of linear actuator 120 along line 6-6 in FIG. 2A. Bearing 420 is received within bore 250 of housing 220. Key 450 is mounted on bearing 420, for example within keyseat 440 of bearing 420. Where keyseat 440 defines a recess into bearing 420, as depicted in FIG. 6, key 450 extends into bearing 420 when key 450 is mounted on bearing 420. Key 450 is secured against rotation relative to bearing 420 by the walls of keyseat 440, and/or by any other components securing key 450 to bearing 420.

When mounted within keyseat 440 of bearing 420, key 450 extends beyond keyseat 440 into keyway 310 defined by insert 260. Key 450 and keyway 310 cooperate to resist rotation of bearing 420 about axis A1 of linear actuator 120, while providing low friction to axial motion of bearing 420 relative to housing 220 along axis A1.

Figure 7:
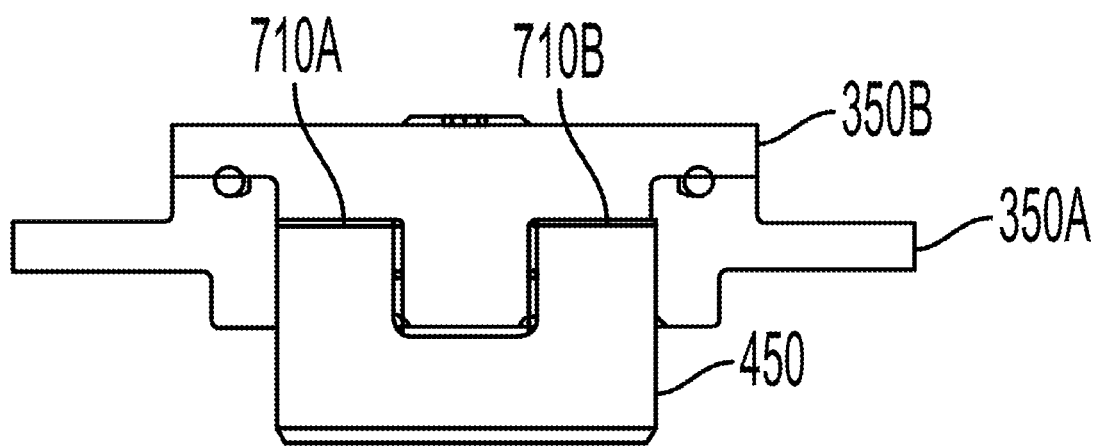
FIG. 7 is a cross-sectional view of a key and an insert defining a keyway according to an example embodiment.

FIG. 7 is a cross-sectional view of key 450, first segment 350A, and second segment 350B. First and second segments 350A and 350B cooperate to define first and second grooves 320A and 320B. Key 450 has first and second projections 710A and 710B which are dimensioned to respectively fit within first and second grooves 320A and 320B.

Figure 8A:
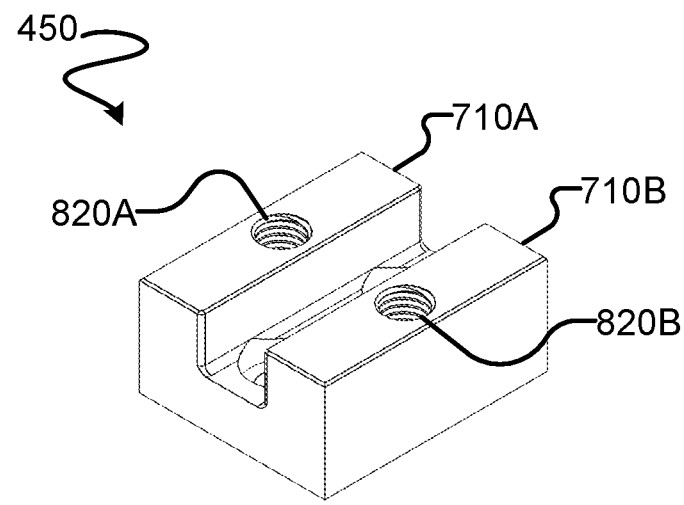
FIGS. 8A and 8B are perspective views of a key according to an example embodiment.
Figure 8B:
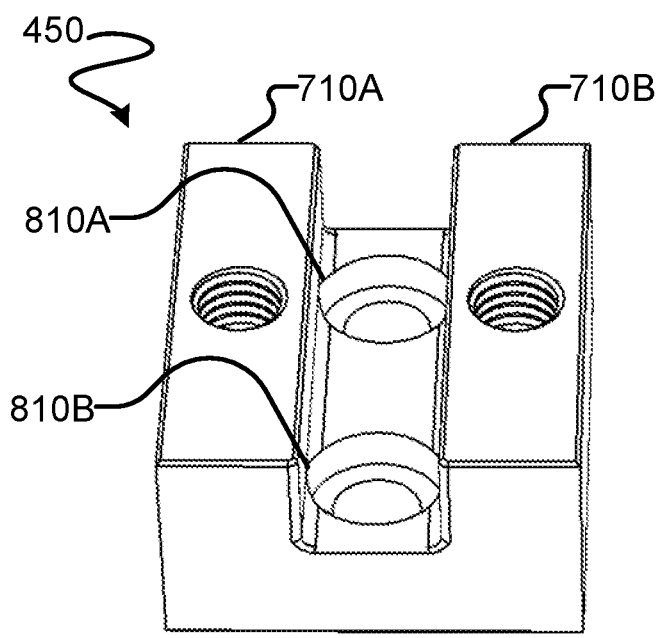

FIGS. 8A and 8B depict key 450 having first and second projections 710A and 710B. Key 450 may define one or more threaded holes 810A and 810B for receiving screws for mounting key 450 on bearing 420. Threaded holes 810A and 810B may be countersunk to accommodate a head of a screw when installed in threaded holes 810A and 810B.

In some embodiments, bearing 420 is a plain bearing or a linear plain bearing.

Key 450 may also define holes 820A and 820B with which to grasp key 450 when inserting and removing key 450 through aperture 330.

In some embodiments, the material or materials used to construct one or more components of linear actuator 120 may be selected to provide a desired hardness, durability, heat resistance, and/or friction. For example, key 450 and insert 260 may be constructed of materials which may be finished to have very low friction, for example metal or ceramic. As a further example, key 450 may be constructed of materials that are softer than a material of insert 260 so that friction between key 450 and insert 260 and will tend to wear down key 450 before insert 260. In some embodiments, key 450 is constructed from bronze, and insert 260 is constructed from steel.

Some embodiments of linear actuator 120 may comprise two or more inserts. Each insert may define one or more keyway. Some embodiments of linear actuator 120 may comprise two or more keys.

Figure 9:
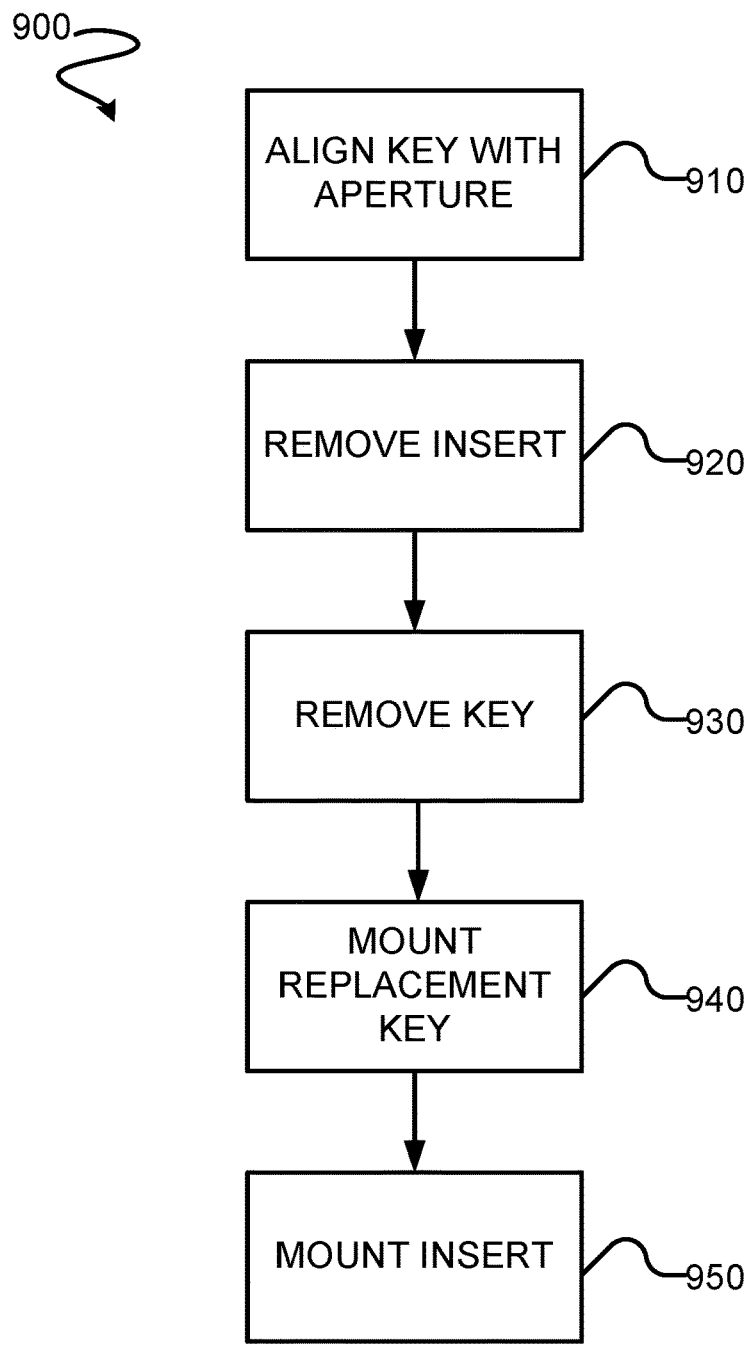
FIG. 9 is a method for replacing a key of an anti-rotation system having a replaceable keyway according to an example embodiment.

FIG. 9 is a flowchart depicting method 900 for replacing a key of an anti-rotation system having a replaceable keyway according to an example embodiment.

At step 910, a key carried by a member is aligned with an aperture in a first insert segment closed by a second insert segment, for example key 450 carried by bearing 420 is aligned with aperture 330 in first segment 350A. Key 450 may be aligned with aperture 330 by extending or retracting output shaft 130 in or out of housing 220. Output shaft 130 may be extended or retracted by powering screw-type mover 124.

At step 920, the second insert segment is removed from the first insert segment exposing the aperture, for example second segment 350B is removed first segment 350A exposing aperture 330. When second segment 350B is removed first segment 350A, aperture 330 exposes key 450 mounted on bearing 420. Second segment 350B may be removed from first segment 350A by first removing screws which extend through second segment 350B into first segment 350A, and then removing second segment 350B from first segment 350A.

At step 930, the key is removed from the member through the aperture, for example key 450 is removed from bearing 420 through aperture 330. Key 450 may be removed from bearing 420 by first removing screws which extend through key 450 into bearing 420, and then removing key 450 from bearing 420. The screws extending through key 450 into bearing 420 may also be accessible through aperture 330.

At step 940, a replacement key is mounted on the member through the aperture, for example a replacement key is mounted on bearing 420 through aperture 330. The replacement key may be mounted on bearing 420 by installing screws which extend through the replacement key into bearing 420.

At step 950, the second insert segment is remounted on the first insert segment closing the aperture, for example second segment 350B is mounted on first segment 350A and closing aperture 330. Second segment 350B may be mounted on first segment 350A by installing screws which extend through the second segment 350B into first segment 350A.

FIG. 10 is a flowchart depicting method 1000 for enabling rotation of an anti-rotation system having a replaceable keyway according to an example embodiment. Method 1000 comprises steps 910, 920, 930 and 950 of method 900.

At step 1010, an output shaft may be rotated once the key is removed from the member, for example output shaft 130 may be rotated within housing 220 once key 450 is removed from bearing 420. Output shaft 130 may be rotated by applying a rotational force to drive head 234 of output shaft 130.

At step 1020, a keyseat is aligned with the aperture in the first insert segment, for example keyseat 440 on bearing 420 is aligned with aperture 330 in first segment 350A. Keyseat 440 may be aligned with aperture 330 by rotating output shaft 130, extending output shaft 130 out of housing 220, or retracting output shaft 130 into housing 220.

At step 1030, the key is remounted within the keyseat of the member, for example key 450 is remounted within keyseat 440 of bearing 420. Key 450 may be mounted on bearing 420 by installing screws which extend through key 450 into bearing 420.

In alternative embodiments of step 910 of methods 900 and 1000, the key carried by the member may be aligned with an aperture in a housing, for example key 450 carried by bearing 420 may be aligned with aperture 240 in housing 220. Step 920 may then comprise removing insert 260 from housing 220 and exposing key 450 of member 420 through aperture 240. Step 930 may then comprise removing key 450 from member 420 through aperture 240, and step 950 may comprise remounting insert 260 on housing 220.

Some embodiments of a removable insert defining a keyway according to the present invention may provide one or more of the following benefits:

forming aperture 240 in housing 220 may be easier, simpler and cheaper than forming a keyway along the interior of bore 250;

forming keyway 310 along insert 260 may be easier, simpler and cheaper than forming a keyway along the interior of bore 250; and keyway 310 may be formed longer and with smaller tolerances than a keyway formed along the interior of bore 250.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. An apparatus comprising:
   a housing having a bore extending along an axis of the housing, and a housing aperture extending from an outside surface of the housing to the bore and extending along the housing parallel to the axis of the housing;
   a member configured to slide within the bore along the axis of the housing;
   an insert defining a keyway removably mounted at least partially within the housing aperture, wherein the keyway is parallel to the axis of the housing; and
   a key carried by the member and engaged with the keyway defined by the insert;
   wherein the key cooperates with the insert to resist rotation of the member about the axis of the housing.

2. The apparatus of claim 1, wherein the keyway extends at least partially into the housing aperture.

3. The apparatus of claim 1, wherein the key is removably mounted on the member.

4. The apparatus of claim 3, wherein the key is removable from the member through the housing aperture.

5. The apparatus of claim 3, wherein the key is removable from the member through the housing aperture when the insert is removed from the housing.

6. An apparatus comprising:
   a housing having a bore extending along an axis of the housing, and a housing aperture extending from an outside surface of the housing to the bore and extending along the housing parallel to the axis of the housing;
   a member configured to slide within the bore along the axis of the housing;
   an insert defining a keyway removably mounted at least partially within the housing aperture; and
   a key carried by the member and engaged with the keyway defined by the insert;
   wherein the key cooperates with the insert to resist rotation of the member about the axis of the housing;
   wherein the key is removably mounted on the member; and
   wherein:
      the insert comprises a first insert segment and a second insert segment;
      the first insert segment and the second insert segment cooperate to define the keyway; and
      the key is removable from the member through the housing aperture when the second insert segment is removed from the housing.

7. The apparatus of claim 6, wherein the first insert segment has an insert aperture, the second insert segment is removably mounted on the first insert segment, and the second insert segment extends at least partially into the insert aperture.

8. The apparatus of claim 7, wherein the key is removable from the member through the insert aperture when the second insert segment is removed from the first insert segment.

9. The apparatus of claim 7, wherein the first insert segment comprises a plurality of parallel walls extending from the first insert segment and at least partially into the housing aperture, the keyway comprises one or more grooves defined by the walls, and one of the walls has a gap aligned with the insert aperture.

10. The apparatus of claim 9, wherein the second insert segment comprises a wall extending from the second insert segment and at least partially into the insert aperture, and the wall of the second insert segment fills in the gap in the one of the walls of the first insert segment when the second insert segment is mounted on the first insert segment.

11. An apparatus comprising:
    a housing having a bore extending along an axis of the housing, and a housing aperture extending from an outside surface of the housing to the bore and extending along the housing parallel to the axis of the housing;
    a member configured to slide within the bore along the axis of the housing;
    an insert defining a keyway removably mounted at least partially within the housing aperture; and
    a key carried by the member and engaged with the keyway defined by the insert;
    wherein the key cooperates with the insert to resist rotation of the member about the axis of the housing;
    wherein the key is removably mounted on the member; and
    wherein the member is rotatable about the axis of the housing within the bore of the housing when the key is removed from the member.

12. An apparatus comprising:
    a housing having a bore extending along an axis of the housing, and a housing aperture extending from an outside surface of the housing to the bore and extending along the housing parallel to the axis of the housing;
    a member configured to slide within the bore along the axis of the housing;
    an insert defining a keyway removably mounted at least partially within the housing aperture; and
    a key carried by the member and engaged with the keyway defined by the insert;
    wherein the key cooperates with the insert to resist rotation of the member about the axis of the housing; and
    wherein the insert comprises a plurality of parallel walls extending from the insert and at least partially into the housing aperture and the keyway comprises one or more grooves defined by the walls.

13. The apparatus of claim 12, wherein the key comprises a number of projections equal to the number of grooves, and the projections extend at least partially into the grooves defined by the walls.

14. The apparatus of claim 13, wherein the projections are dimensioned to slide through the grooves along the axis of the housing, and the walls defining the grooves are dimensioned to resist movement of the projections within the grooves about the axis of the housing.

15. An apparatus comprising:
    a housing having a bore extending along an axis of the housing, and a housing aperture extending from an outside surface of the housing to the bore and extending along the housing parallel to the axis of the housing;
    a member configured to slide within the bore along the axis of the housing;
    an insert defining a keyway removably mounted at least partially within the housing aperture; and
    a key carried by the member and engaged with the keyway defined by the insert;
    wherein the key cooperates with the insert to resist rotation of the member about the axis of the housing; and
    wherein the bore has a first cross-section perpendicular to the axis of the housing and the member is a bearing with a second cross-section perpendicular to the axis of the housing substantially equal to the first cross-section.

16. The apparatus of claim 15, wherein the bearing is a linear plain bearing.

17. An apparatus comprising:
a housing having a bore extending along an axis of the housing, and a housing aperture extending from an outside surface of the housing to the bore and extending along the housing parallel to the axis of the housing;
a member configured to slide within the bore along the axis of the housing;
an insert defining a keyway removably mounted at least partially within the housing aperture; and
a key carried by the member and engaged with the keyway defined by the insert;
wherein the key cooperates with the insert to resist rotation of the member about the axis of the housing; and
wherein the housing has a ledge extending at least partially around the housing aperture and the insert comprises a flange extending along a periphery of the insert configured to abut the ledge when the insert is mounted at least partially within the housing aperture.

18. An apparatus comprising:
a housing having a bore extending along an axis of the housing, and a housing aperture extending from an outside surface of the housing to the bore and extending along the housing parallel to the axis of the housing;
a member configured to slide within the bore along the axis of the housing;
an insert defining a keyway removably mounted at least partially within the housing aperture; and
a key carried by the member and engaged with the keyway defined by the insert;
wherein the key cooperates with the insert to resist rotation of the member about the axis of the housing; and
wherein the insert comprises a first material, the key comprises a second material, and the second material is softer than the first material.

* * * * *